US012796612B2

(12) United States Patent
Carpenedo

(10) Patent No.: US 12,796,612 B2
(45) Date of Patent: Nov. 17, 2026

(54) SUGARCANE HARVESTER WITH STALK-SUPPORTING MECHANISM

(71) Applicant: AGCO DO BRASIL SOLUÇÕES AGRÍCOLAS LTDA, Ribeireo Preto (BR)

(72) Inventor: Marcelo Carpenedo, Canoas (BR)

(73) Assignee: AGCO do Brasil Soluções Agrícolas Ltda., Ribeirao Preto (BR)

( * ) Notice: Subject to any disclaimer, the term of this patent is extended or adjusted under 35 U.S.C. 154(b) by 299 days.

(21) Appl. No.: 18/683,286

(22) PCT Filed: Aug. 9, 2022

(86) PCT No.: PCT/IB2022/057412
§ 371 (c)(1),
(2) Date: Feb. 13, 2024

(87) PCT Pub. No.: WO2023/052856
PCT Pub. Date: Apr. 6, 2023

(65) Prior Publication Data

US 2024/0365709 A1 Nov. 7, 2024

(30) Foreign Application Priority Data

Sep. 30, 2021 (GB) ..................................... 2114015

(51) Int. Cl.
*A01D 45/10* (2006.01)
*A01D 61/02* (2006.01)
*A01D 61/04* (2006.01)

(52) U.S. Cl.
CPC ............. *A01D 45/10* (2013.01); *A01D 61/02* (2013.01); *A01D 61/04* (2013.01)

(58) Field of Classification Search
CPC ......... A01D 61/02; A01D 61/04; A01D 45/10
See application file for complete search history.

(56) References Cited

U.S. PATENT DOCUMENTS

| | | | | |
|---|---|---|---|---|
| 1,726,043 A * | 8/1929 | Scranton | A01D 45/10 | 56/10.4 |
| 2,435,334 A * | 2/1948 | Wurtele | A01D 45/10 | 56/119 |
| 2,556,509 A * | 6/1951 | Thomson | A01D 45/10 | 56/5 |

(Continued)

FOREIGN PATENT DOCUMENTS

| | | | |
|---|---|---|---|
| BR | PI 0706022 * | 1/2007 | A01D 45/10 |
| CN | 203387914 U | 1/2014 | |
| WO | WO-2022016249 A1 * | 1/2022 | A01D 45/003 |

OTHER PUBLICATIONS

UK Intellectual Property Office, Search Report for GB Application No. GB2114015.7, dated Jun. 22, 2022, 4 pages.

(Continued)

*Primary Examiner* — Adam J Behrens

(57) ABSTRACT

A sugarcane harvester includes a basecutter assembly for cutting sugarcane stalks from sugarcane plants; a stalk-supporting mechanism for supporting the stalks of the sugarcane plants as they are being cut by the basecutters; a chopping section for chopping the sugarcane stalks into billets; and a discharge assembly for discharging the billets to a storage vehicle.

14 Claims, 5 Drawing Sheets

(56) References Cited

U.S. PATENT DOCUMENTS 3,871,162 A * 3/1975 Schexnayder, Jr. .... A01D 45/10 56/60
4,408,441 A * 10/1983 Willett .................. A01D 45/10 56/63
4,722,174 A * 2/1988 Landry .................. A01D 45/10 56/192
4,744,452 A * 5/1988 Broussard ............. A01D 45/10 56/192
5,303,533 A * 4/1994 Caillouet ............... A01D 45/10 56/192
5,379,578 A * 1/1995 Landry .................. A01D 45/10 56/14.5
6,807,799 B2 * 10/2004 Reaux .................... A01D 45/00 56/64
9,826,685 B2 * 11/2017 Mello .................... A01D 45/10
2004/0074217 A1 * 4/2004 Reaux .................... A01D 45/00 56/51
2005/0034439 A1 2/2005 Galea
2015/0359177 A1 12/2015 Richard et al.
2015/0362904 A1 * 12/2015 Scrivner ............. A01D 41/127 700/275
2016/0150730 A1 * 6/2016 Mello .................... A01D 45/10 56/119
2017/0112063 A1 4/2017 Craig
2017/0280626 A1 10/2017 Bertino
2023/0276730 A1 * 9/2023 Barretto ................. A01D 33/14 56/10.1
2023/0284559 A1 * 9/2023 Pereira de Camargo .................... A01D 34/24

OTHER PUBLICATIONS

European Patent Office, Search Report for PCT Application No. PCT/IB2022/057412, dated Oct. 27, 2022, 11 pages.

* cited by examiner

SUGARCANE HARVESTER WITH STALK-SUPPORTING MECHANISM

CROSS-REFERENCE TO RELATED APPLICATIONS

This application is a national phase entry under 35 U.S.C. § 371 of International Patent Application PCT/IB2022/057412, filed Aug. 9, 2022, designating the United States of America and published in English as International Patent Publication WO 2023/052856 A1 on Apr. 6, 2023, which claims the benefit of the filing date of U. K. Patent Application 2114015.7 "Sugarcane Harvester with Stalk-Supporting Mechanism," filed Sep. 30, 2021, the entire disclosure of which is incorporated herein by reference.

BACKGROUND

Sugarcane harvesters are large moveable agricultural machines that harvest and partially process sugarcane. A typical sugarcane harvester cuts sugarcane stalks from sugarcane plants as it moves through the plants, strips leaves from the sugarcane stalks, cuts the sugarcane stalks into billets, and ejects the leaves, stems, and other waste material back onto the sugarcane field where they act as fertilizers.

Sugarcane farming can benefit greatly from ratooning. Ratooning is a method of sugarcane propagation in which subterranean buds on the stubble, the part of the plants left underground after harvesting, give rise to a new crop stand, which is usually referred to as the 'ratoon' or the 'stubble crop' as opposed to 'plant crop', which is raised from seeds or seedlings. Ratooning reduces the cost of cultivation by eliminating or reducing the need for new seed material and related land preparation and preparatory irrigation. It also results in early ripening of canes.

With proper plant management and protection, ratooning can remain productive for multiple seasons before declines in cane yield necessitate new seed material. Unfortunately, conventional sugarcane harvesters often damage sugarcane plants, which diminishes the productivity of the ratoon crop. Typical sugarcane harvesters include knock-down rollers that knock-down sugarcane plants and basecutters with rotating blades that sever the stalks from the knocked-down sugarcane plants. These knock-down rollers and basecutters often dislocate and sometimes completely unearth the subterranean buds on the plants as the sugarcane stalks are being cut.

SUMMARY

The present invention solves at least some of the above-described problems and related problems and provides a distinct advance in the art of sugarcane harvesters. More particularly, the present invention provides a sugarcane harvester that reduces the damage to subterranean buds on sugarcane plants as the plants are harvested to improve subsequent ratoon yield from the plants.

A sugarcane harvester constructed in accordance with an embodiment of the invention broadly comprises an intake and cutting assembly; a chopping section; and a discharge assembly. The intake and cutting assembly cuts sugarcane stalks from sugarcane plants as the sugarcane harvester moves through the plants. The chopping section receives the sugarcane stalks from the intake and cutting assembly and chops or otherwise cuts the sugarcane stalks into billets. The discharge assembly receives the sugarcane billets from the chopping section and then discharges the billets into a wagon or other storage vehicle that travels alongside the harvester. The harvester may also include one or more extractor fans or blowers that separate leaves, stems, and other crop residue from the billets and discharges the debris back into the sugarcane field.

An embodiment of the intake and cutting assembly includes a topper to cut off the leafy top portions of the sugarcane plants; one or more crop divider scrolls to divide and separate the sugarcane plants; one or more knockdown rollers to knock down the sugarcane plants; basecutters with rotating blades that sever the stalks from the knocked-down sugarcane plants; and a feed section to feed the sugarcane stalks rearwardly to the chopping section.

In accordance with an important aspect of the present invention, the intake and cutting assembly also includes stalk-supporting mechanisms for supporting the stalks of the sugarcane plants as they are being cut by the basecutters. The stalk-supporting mechanisms limit dislocation and unearthing of the subterranean buds of the plants and otherwise limit stress on the plants.

In one embodiment, the stalk-supporting mechanisms comprise a pair of spaced apart, rotating conveyors that grip the stalks of the sugarcane plants as they enter the intake and cutting assembly, guide the plants toward the basecutters, and support the plants in a generally upright orientation as they are cut by the basecutters. This limits or even prevents disruption of the underground buds and relieves other stresses on the plants.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
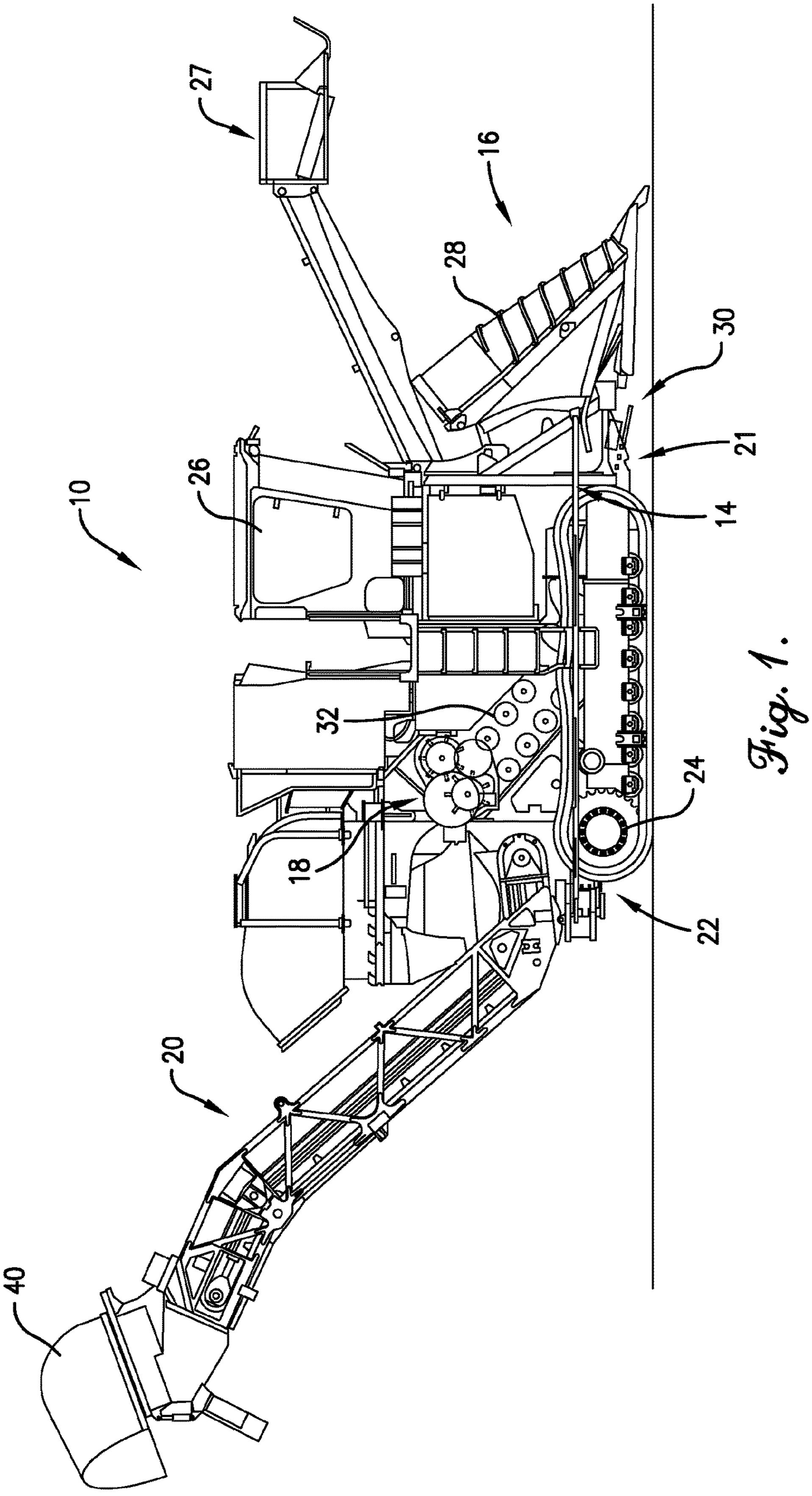
FIG. 1 is side elevational view of a sugarcane harvester constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 3:
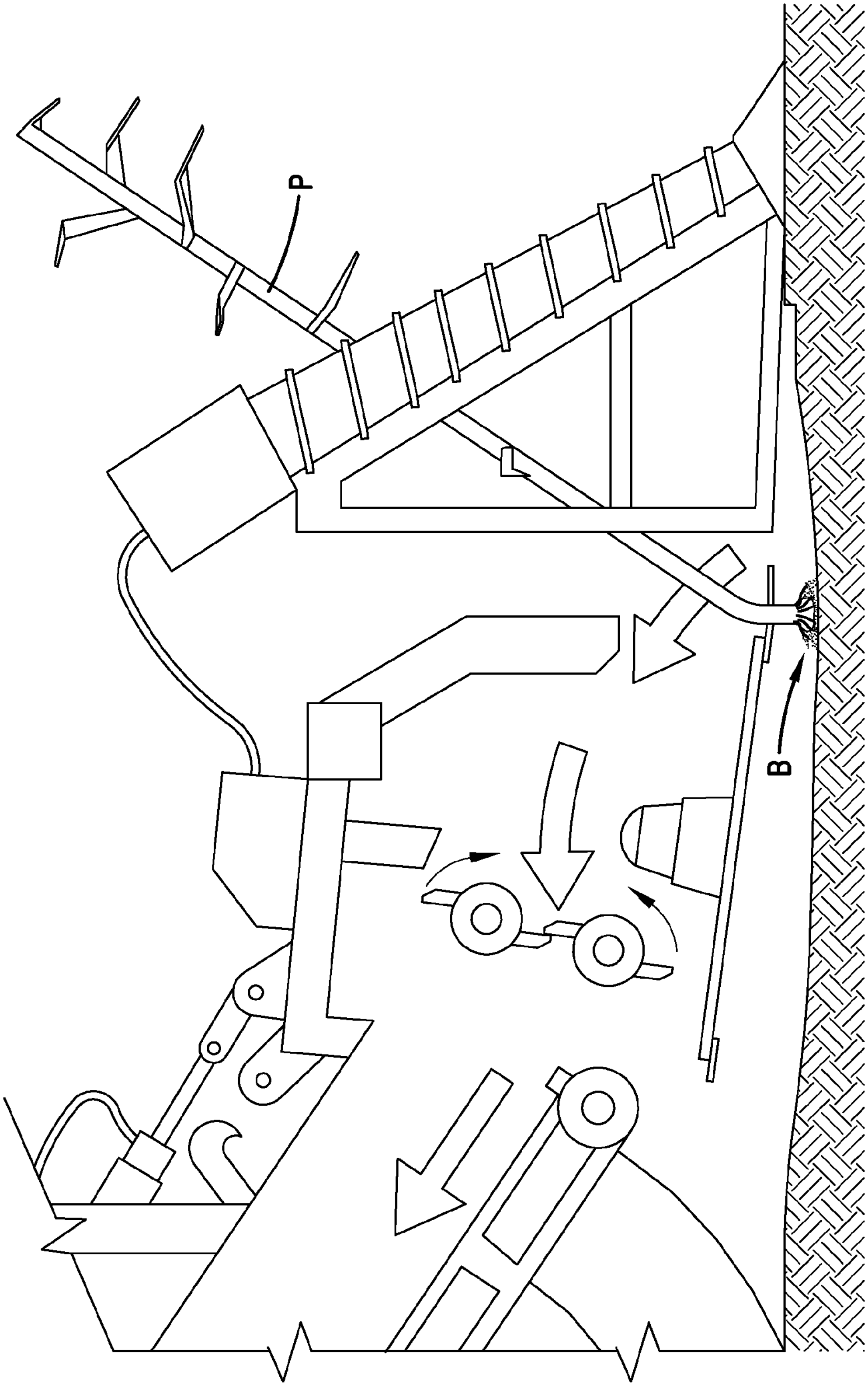
Fig. 3. PRIOR ART
FIG. 3 is a schematic side sectional view of a portion of a prior art sugarcane harvester shown cutting a sugarcane plant.

Turning now to the drawing figures, a sugarcane harvester 10 constructed in accordance with embodiments of the invention is illustrated. As explained in more detail below, the sugarcane harvester 10 includes stalk-supporting mechanisms for supporting the stalks of sugarcane plants P as the plants P are being cut by basecutters. The stalk-supporting mechanisms limit dislocation and unearthing of subterranean buds of the plants and otherwise limit stress on the plants. In contrast, as shown in FIG. 3, prior art harvesters often dislocate and sometimes completely unearth the subterranean buds B on sugarcane plants P as the plants are being cut.

Referring initially to FIG. 1, an embodiment of the sugarcane harvester 10 broadly comprises a movable chassis 14; an intake and cutting assembly 16; a chopping section 18; and a discharge assembly 20. Other embodiments of the sugarcane harvester 10 may have additional and/or different components.

The chassis 14 has a forward end 21 and a rearward end 22 disposed along a longitudinal axis that is essentially parallel to a ground surface over which the harvester travels. The chassis 14 rides on wheels, belts, or other ground-engaging traction elements 24 that are driven by conventional motors, transmissions, and associated mechanical and electrical components. An operator's station 26 may be supported on top the chassis, although the harvester may also include various sensors and controls that provide autonomous operation without direct operator control.

Figure 4:
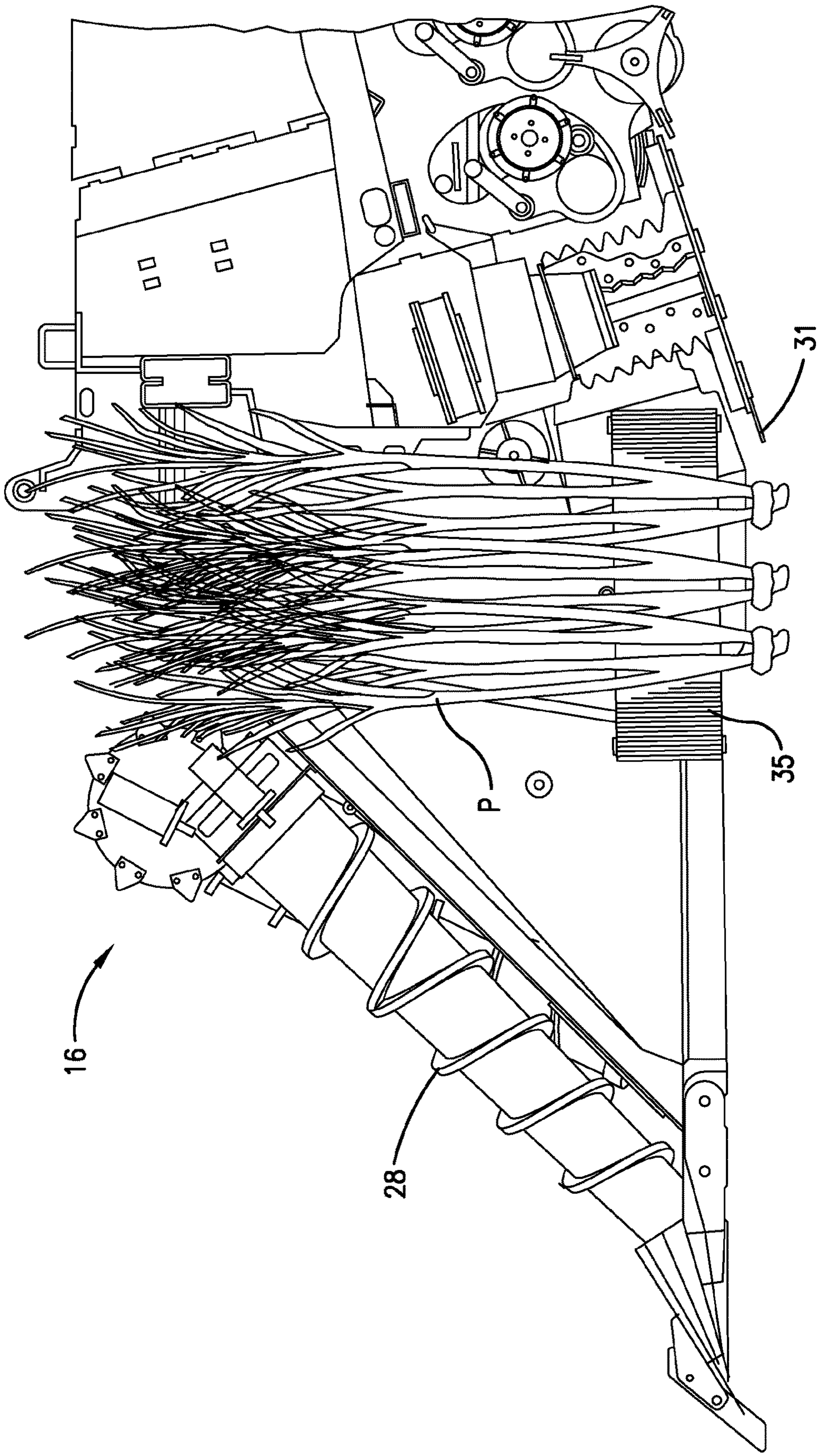
FIG. 4 is a partial side sectional view of the harvester of the present invention shown cutting sugarcane plants.
Figure 5:
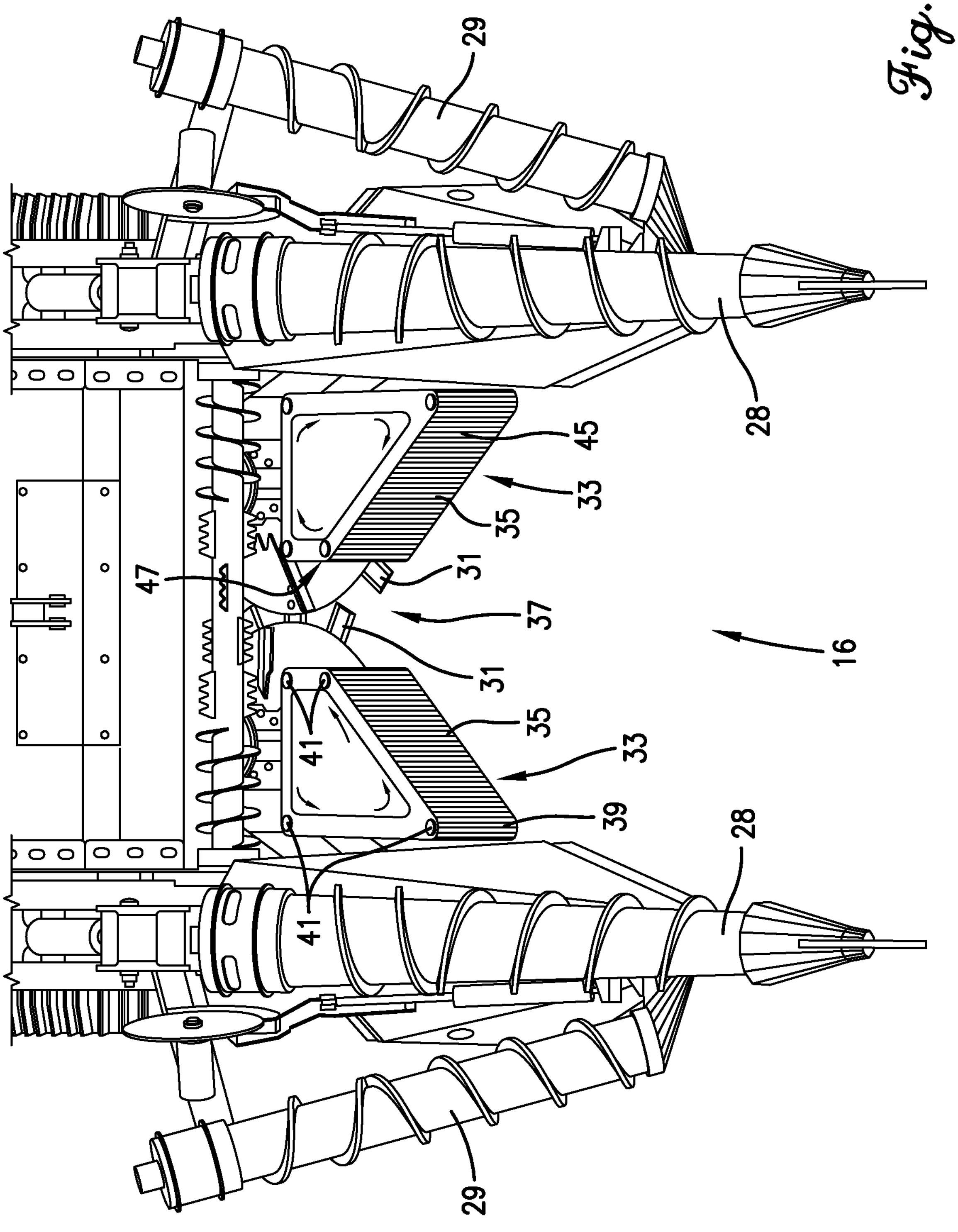
FIG. 5 is a partial top perspective view of the intake and cutting assembly of the harvester.

As best shown in FIGS. 1, 4, and 5, the intake and cutting assembly 16 is supported on the forward end 21 of the chassis 14 for cutting sugarcane stalks from sugarcane plants P as the sugarcane harvester moves through the plants. The intake and cutting assembly 16 may include a topper 27 to cut off the leafy top portions of the sugarcane plants, one or more crop divider scrolls 28 to divide and separate the sugarcane plants, one or more knockdown rollers 29 to knock down the sugarcane plants, one or more basecutter assemblies 30 to sever sugarcane stalks from the sugarcane plants, and a feed section 32 to feed the sugarcane stalks rearwardly to the chopping section 18.

The basecutter assemblies 30 include rotary blades 31 or other cutting implements and at least one hydraulic motor or other drive mechanism for rotating the blades. The basecutters 30 can be adjusted up or down so the blades are any distance above the ground.

In accordance with an important aspect of the present invention, the intake and cutting assembly 16 also includes stalk-supporting mechanisms 33 for supporting the stalks of the sugarcane plants P as they are being cut by the basecutters. The stalk-supporting mechanisms relieve stress on the subterranean buds of the plants and/or other strains on the plants to encourage ratooning and general health of the plants.

In one embodiment, the stalk-supporting mechanisms comprise a pair of spaced apart, rotating conveyors 35. The conveyors 35 are supported between the crop divider scrolls 28 and above the basecutter blades 31 and present an intake gap 37 between them. As best shown in FIG. 4, the conveyors 35 grip the stalks of the sugarcane plants as they enter the intake and cutting assembly, guide the plants toward the intake gap 37 above the basecutters, and support the plants in a generally upright orientation as they are being cut by the basecutter blades to relieve stress on the subterranean buds of the plants.

Figure 2:
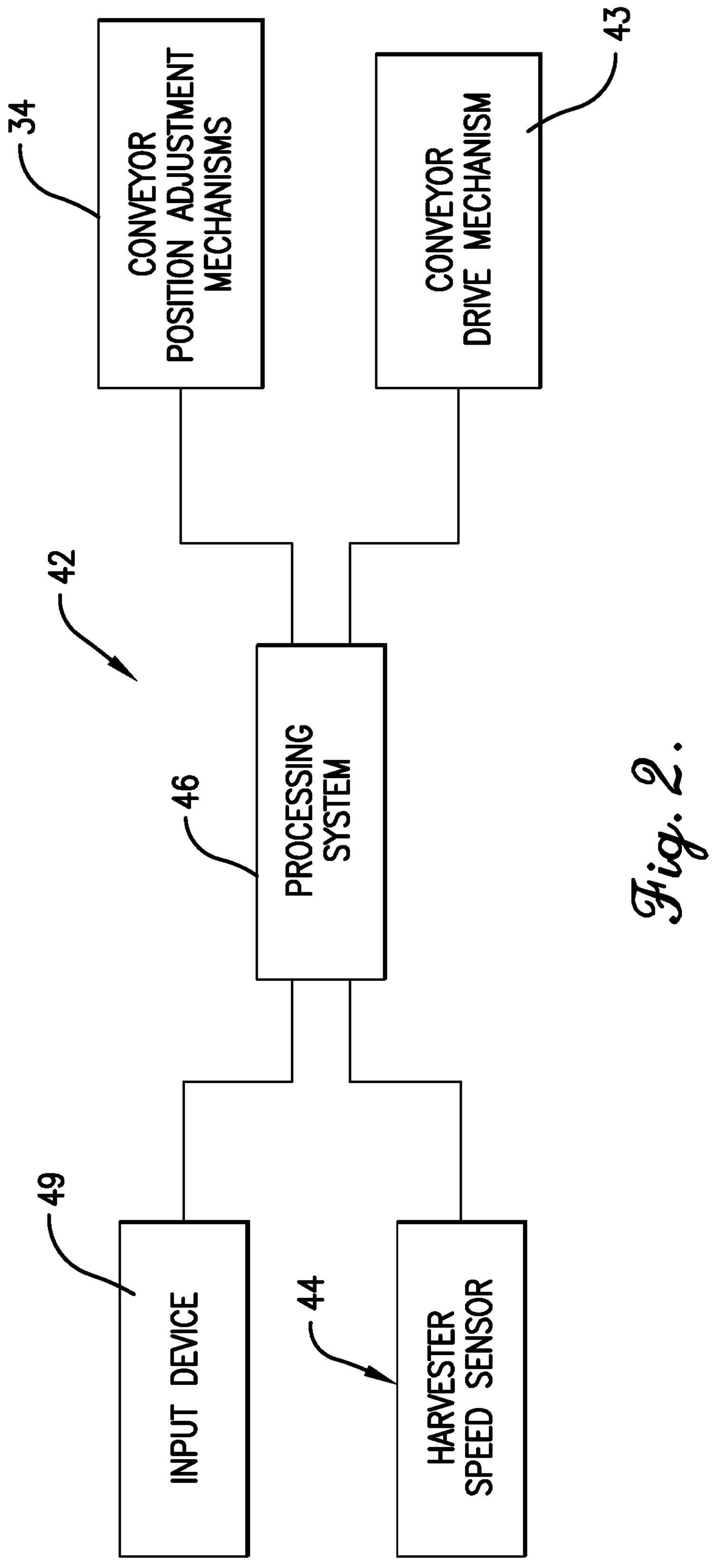
FIG. 2 is a block diagram of an exemplary control system for the sugarcane harvester.

In a particular embodiment, each conveyor 35 includes a ribbed chain or belt 39 trained over four rollers 41 in a trapezoid shape. The conveyor belt or chain may be any width, and in one embodiment is 2-24 inches wide so as to support 2-24 inches of the stalk of each sugarcane plant cut by the basecutters. The chain or belt 39 may be driven by an electric or hydraulic motor or other drive mechanism 43 as shown in FIG. 2.

One side 45 of each conveyor is angled inwardly toward the intake gap, and another side 47 extends generally parallel to a path of travel of the harvester and is positioned above the basecutter blades 31. In one embodiment, the angles sides 45 extend inwardly approximately 30-60 degrees relative to the path of travel of the harvester. The angled sides 45 initially contact and grip the sugarcane plants and gently urge them toward the intake gap, and the sides 47 that are generally parallel to the path of travel of the harvester hold the stalks of the plants as they are being cut by the basecutter.

In one embodiment, the conveyors 35 rotate in opposite directions at a speed that corresponds to a ground speed of the harvester. If the harvester speeds up, the conveyors rotate faster as well. This gently pulls the plants toward the basecutters without tearing them or knocking them down. As seen from the perspective of FIG. 5, the left conveyor rotates in a counterclockwise direction and the right conveyor rotates in a clockwise direction. The speed of the conveyors may be controlled by gearing and/or the processing system 46.

In one embodiment, the conveyors 35 are spaced 1-4 feet apart to present an intake gap 37 with a width of 1-4 feet. In other embodiments, one or both conveyors may be laterally movable by cylinders or motors to adjust the distance between the conveyors and hence the width of the intake gap. The distance between the conveyors may be adjusted to accommodate different densities of sugarcane crop. For example, a greater distance between the conveyors may be selected for denser crops, and a lesser distance may be selected for less dense crops.

The lowermost portions of the conveyors are preferably mounted 12-48 inches above the basecutter blades 31 so as to support portions of the sugarcane stalk 12-48 inches above the portions cut by the basecutter blades. In some embodiments, the conveyors 35 may be vertically movable by cylinders, motors, or other position adjustment mechanisms 34 (FIG. 2) to adjust their height above the basecutters. The conveyors may also be horizontally movable by the same or other cylinders or motors to adjust their horizontal distances from the basecutters.

The chopping section 18 is supported between the forward and rearward ends of the chassis 14 and receives the sugarcane stalks from the intake and cutting assembly 16 and chops or otherwise cuts the sugarcane stalks into billets. In one embodiment, the chopping section includes chopping blades and a hydraulic motor for driving the chopping blades.

In some embodiments, the sugarcane harvester 10 also comprises an internal bin or other storage mechanism supported on the chassis 14 between the chopping section 18 and the discharge assembly 12 for storing a quantity of the billets before they are discharged from the harvester.

The discharge assembly 20 is positioned at or near the rear of the harvester and receives the sugarcane billets from the chopping section 18 and discharges the billets into a wagon or other storage vehicle that travels alongside the harvester. The discharge assembly may comprise elevators, conveyors, and the like that receive the billets from the chopping section 18, elevate the billets, and discharge them from the harvester. In one embodiment, the discharge assembly comprises at least one hydraulic motor for driving the elevators or conveyors.

The discharge assembly 20 may also comprise one or more extractor fans 40 or blowers that direct pressurized air over the billets to separate leaves, stems, and other crop residue from the billets and discharge the debris back into the sugarcane field.

The sugarcane harvester may also include a control system 42 shown in FIG. 2 for controlling the speed and positioning of the conveyors 35. The control system 42 includes a processing system 46. The processing system may be any type of circuitry or other computing elements that are operable to receive signals from a harvester speed sensor 44 and provide control and/or power signals to the conveyor drive mechanism 43 and the position adjustment mechanism 34. The processing system may also be operable to receive signals from a knob, switch, user interface, or other input device 49 and provide control and/or power signals to the conveyor position adjustment mechanisms. As described above, the processing system 46 may adjust the rotational speed of the conveyors, the vertical height of the conveyors, the horizontal positioning of the conveyors relative to the basecutters, and/or the distance between the conveyors. In some embodiments, these adjustments are initiated manually by the input device 49, and in other embodiments, these adjustments are performed automatically and triggered by the sensor 44 and/or other sensors that sense sugarcane crop density, crop height, or other characteristics of the crops and/or the field in which they are grown.

The processing elements may be coupled with suitable relays, switches, and/or valves and may be programmed with logic or a number of routines, subroutines, applications, or instructions for performing the instructions described herein. The processing system 46 may also include or be coupled with communication elements for sending data to remote control devices and for receiving instructions from the remote devices.

Additional Considerations

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing system, element, or the like may be implemented as special purpose or as general purpose. For example, the processing system 46 may comprise dedicated circuitry or logic that is permanently configured, such as an application-specific integrated circuit (ASIC), or indefinitely configured, such as an FPGA, to perform certain operations. The processing system may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term “processing system” or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A sugarcane harvester for harvesting sugarcane stalks from sugarcane plants, the sugarcane harvester comprising:

an intake and cutting assembly for cutting the sugarcane stalks from the sugarcane plants as the sugarcane harvester moves through the sugarcane plants, the intake and cutting assembly including— basecutters for cutting bases of the sugarcane plants, and a stalk-supporting mechanism for supporting the stalks of the sugarcane plants as they are being cut by the basecutters;

a plurality of crop divider scrolls;

a chopping section for receiving the sugarcane stalks from the intake and cutting assembly and chopping the sugarcane stalks into billets; and a discharge assembly for receiving the billets from the chopping section and discharging the billets to a wagon or other storage vehicle or mechanism, wherein the stalk-supporting mechanism includes a pair of spaced apart, rotating conveyors, the conveyors including ribbed belts that rotate in opposite directions at a speed that corresponds to a groundspeed of the harvester, and wherein the conveyors are located between the crop divider scrolls, are located between twelve and twenty-four inches above and over the basecutters, and are spaced between twelve and twenty-four inches apart.

2. The sugarcane harvester as set forth in claim 1, wherein the conveyors grip the sugarcane stalks as they enter the intake and cutting assembly, guide the stalks toward the intake gap, and support the stalks in a generally upright orientation as they are cut by the basecutters to relieve stress on the plants.

3. The sugarcane harvester as set forth in claim 1, wherein each conveyor includes four rollers and the ribbed belts are trained over the rollers in a trapezoidal shape.

4. The sugarcane harvester in claim 3, wherein each conveyor includes an angled side that is angled inwardly toward the gap.

5. The sugarcane harvester in claim 4, wherein the angled sides initially contact and grip the sugarcane plants and gently urge the sugarcane plants toward the gap.

6. The sugarcane harvester in claim 3, wherein each conveyor further includes a short side positioned above the basecutter blades that extends generally parallel to a path of travel of the harvester.

7. The sugarcane harvester in claim 6, wherein the short sides hold the stalks of the plants as the plants are being cut by the basecutters.

8. The sugarcane harvester as set forth in claim 3, wherein the ribbed belts are each 2-24 inches wide.

9. The sugarcane harvester in claim 1, wherein the basecutters include rotary blades and a hydraulic motor for rotating the blades.

10. The sugarcane harvester in claim 1, further comprising one or more extractor fans or blowers that separate leaves, stems, and other crop residue from the billets and discharge the debris back into the sugarcane field.

11. A sugarcane harvester for harvesting sugarcane stalks from sugarcane plants, the sugarcane harvester comprising:

an intake and cutting assembly for cutting the sugarcane stalks from the sugarcane plants as the sugarcane harvester moves through the sugarcane plants, the intake and cutting assembly including— basecutters for cutting bases of the sugarcane plants, wherein the basecutters include rotary blades, and a stalk-supporting mechanism for supporting the stalks of the sugarcane plants as they are being cut by the basecutters, the stalk-supporting mechanism comprising a pair of spaced apart, rotating conveyors that present an intake gap between them, wherein the conveyors grip the sugarcane stalks as they enter the intake and cutting assembly, guide the stalks toward the intake gap, and support the stalks in a generally upright orientation as they are cut by the basecutters to relieve stress on subterranean buds of the plants;

a plurality of crop divider scrolls;

a chopping section for receiving the sugarcane stalks from the intake and cutting assembly and chopping the sugarcane stalks into billets;

a discharge assembly for receiving the billets from the chopping section and discharging the billets to a wagon or other storage vehicle or mechanism; and extractor fans or blowers that separate leaves, stems, and other crop residue from the billets and discharge the debris back into the sugarcane field, wherein the conveyors include ribbed belts that rotate in opposite directions at a speed that corresponds to a groundspeed of the harvester, and wherein the conveyors are located between the crop divider scrolls, are located between twelve and twenty-four inches above and over the basecutters, and are spaced between twelve and twenty-four inches apart.

12. The sugarcane harvester in claim 11, wherein each conveyor includes four rollers and the ribbed belts are trained over the rollers in a trapezoidal shape.

13. The sugarcane harvester in claim 11, wherein each conveyor includes an angled side that is angled inwardly toward the intake gap, wherein the angled sides initially contact and grip the sugarcane plants and gently urge the sugarcane plants toward the intake gap.

14. The sugarcane harvester in claim 13, wherein each conveyor further includes a short side positioned above the basecutter blades that extends generally parallel to a path of travel of the harvester, wherein the short sides hold the stalks of the plants as the plants are being cut by the basecutters.

* * * * *